United States Patent [19]
Dowling, Jr. et al.

[11] Patent Number: 5,357,566

[45] Date of Patent: Oct. 18, 1994

[54] OBJECT-ORIENTED PROGRAMMABLE DEDICATED DIALER DEVICE AND METHOD OF PROGRAMMING AND CALIBRATING THE DEVICE

[75] Inventors: Thomas W. Dowling, Jr., El Paso, Tex.; Robert Hotto, La Jolla, Calif.; Yinon Barzilai, El Paso, Tex.; Yuval Shenkel, San Diego, Calif.

[73] Assignee: Fone-It Inc., El Paso, Tex.

[21] Appl. No.: 45,918

[22] Filed: Apr. 12, 1993

[51] Int. Cl.5 .............................................. H04M 1/00
[52] U.S. Cl. .................................. 379/355; 379/357; 379/359; 379/354; 379/216
[58] Field of Search ................ 379/355, 357, 216, 354

[56] References Cited

U.S. PATENT DOCUMENTS

| | | | |
|---|---|---|---|
| 4,126,768 | 11/1978 | Grenzow | 379/357 |
| 4,817,135 | 3/1989 | Winebaum | 379/357 |
| 4,868,849 | 9/1989 | Tamaoki | 379/357 |
| 4,882,750 | 11/1989 | Henderson et al. | 379/355 |
| 4,887,294 | 12/1989 | Ruey-Guang | 379/355 |
| 4,907,264 | 3/1990 | Seiler et al. | 379/355 |
| 4,941,172 | 7/1990 | Winebaum et al. | 379/355 |
| 4,975,948 | 12/1990 | Andresen et al. | 379/355 |
| 4,980,910 | 12/1990 | Oba et al. | 379/355 |
| 4,989,240 | 1/1991 | Fuse et al. | 379/355 |
| 5,054,051 | 10/1991 | Hoff | 379/56 |
| 5,054,058 | 10/1991 | Kakizawa | 379/216 |

Primary Examiner—James L. Dwyer
Assistant Examiner—Jacques M. Saint-Surin
Attorney, Agent, or Firm—John R. Flanagan

[57] ABSTRACT

An object-oriented programmable dedicated dialer device includes a hollow disc-shaped body having a front cover and a rear base facing and attached with one another and defining an interior cavity, a telephone number dialing mechanism disposed in the interior cavity and mounted on the rear base, and a touch sensor mounted to the hollow body and connected to the telephone number dialing mechanism. The telephone number dialing mechanism includes a microcontroller, a battery, and a sound-generating transducer. The microcontroller stores a telephone number in its memory. The touch sensor is operable in response to a user touching the touch sensor to convert the microcontroller from a deactivated to activated to cause the dialing mechanism to dial the stored telephone number. Thus, when the touch sensor is touched activating the microcontroller, the dialing mechanism begins operation to generate the plurality of DTMF tones necessary to dial the stored telephone number. The touch sensor and a graphic or logo of the organization whose telephone number is stored in the microcontroller are mounted on the exterior of the front cover of the hollow body.

18 Claims, 5 Drawing Sheets

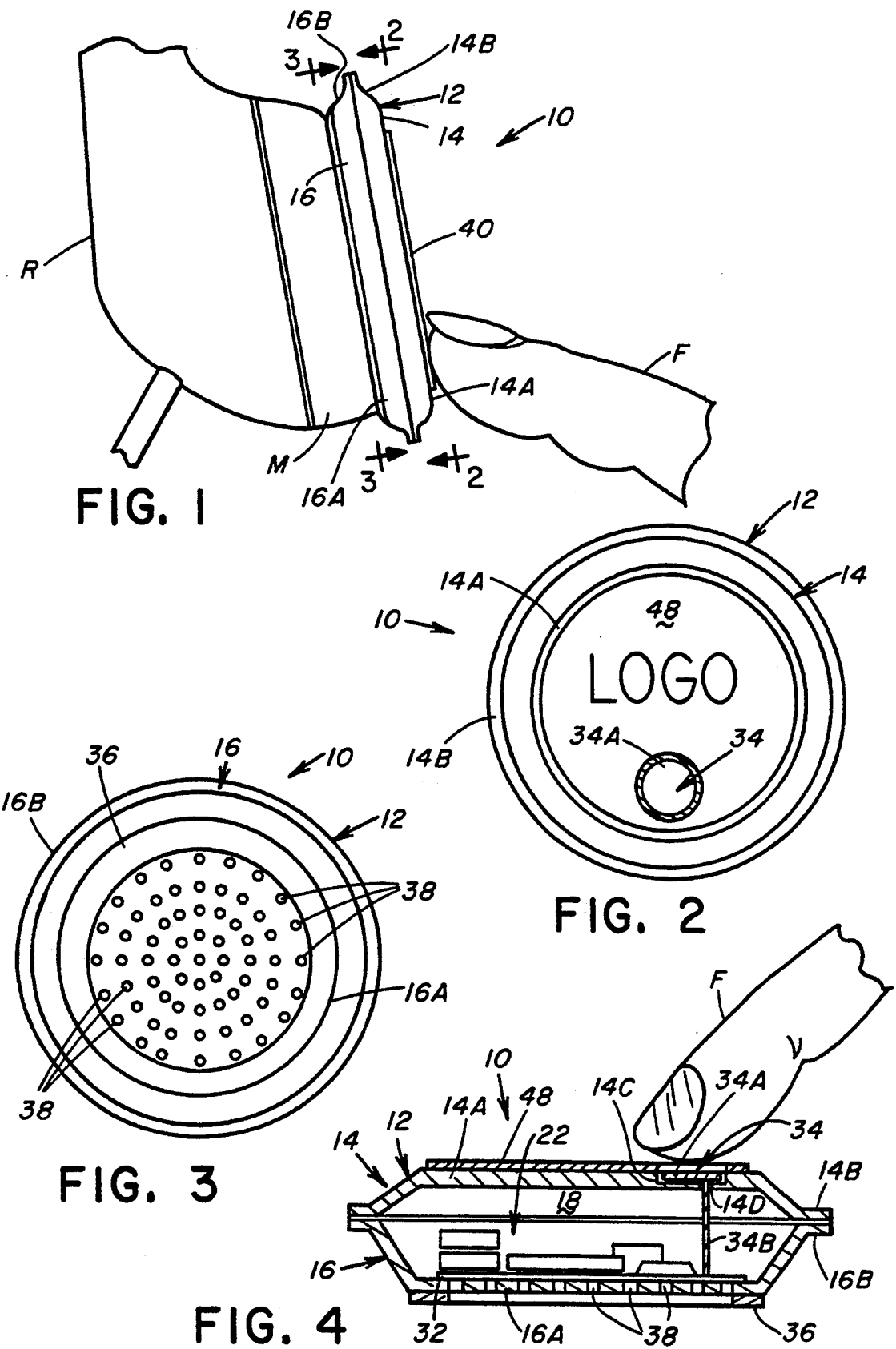

OBJECT-ORIENTED PROGRAMMABLE DEDICATED DIALER DEVICE AND METHOD OF PROGRAMMING AND CALIBRATING THE DEVICE

BACKGROUND OF THE INVENTION

1. Field of the Invention

The present invention generally relates to the field of portable DTMF telephone number dialer devices and, more particularly, is concerned with an object-oriented programmable dedicated dialer device and method of programming and calibrating the device.

2. Description of the Prior Art

It is a very common practice for companies to give specialty manufactured gifts to customers and prospective customers in an effort to generate more business. These gifts are generally inexpensive items that have been customized to carry company logos, addresses, telephone numbers and similar materials.

An entire industry has developed to manufacture these "give-away" items. This industry is known generally as the specialty advertising industry. The variety of ornamental and functional gift items manufactured in this industry include business cards, pencils, calendars, clocks, and calculators. One very important goal of the specialty advertising industry is to make a company's phone number easily accessible to potential customers.

The use of dial tone multi-frequency (DTMF) signals for dialing telephone numbers is well-known in the art and has been in use since the 1950s. Many prior art DTMF dialer devices exist which enable a user to dial a DTMF telephone number either by keying in a series of key strokes or by pressing one user programmed key. One drawback of these devices is that they must either be programmed by the user before the device is capable of dialing or the user must discreetly dial the telephone number. A further drawback of these devices is that the user must go through a series of procedures after powering on in order to activate the dialing of a desired telephone number.

DTMF dialer devices disclosed in U.S. Pat. Nos. 4,817,135 and 4,941,172 to Winebaum have addressed usage by the specialty advertising industry. These patents disclose a card-like object incorporating an automatic mechanism for dialing a single telephone number, such as the telephone number of a company distributing the card. The card-like object is intended to be distributed with mass media such as magazines, books, newspapers, direct mail advertising products and/or services, etc. The card-like object is constructed of stiff paper or cardboard or a plastic and encloses a tone generator circuit and an associated miniature battery and speaker or other sound transducer. The tone generator circuit includes a microprocessor, a read only memory (ROM), and a random access memory (RAM). The tone generator circuit is a DTMF generator which decodes a telephone number preprogrammed and stored in the ROM and generates a sequence of corresponding DTMF tones which are fed via an amplifier to the speaker.

To activate the tone generator circuit, a switch must be actuated by the opening of a flap of the card-like object or by a push button accessible through a hole in the card-like object. This mode of use can be awkward for many consumers and thus is a significant drawback to practical acceptance of this card by present and potential customers.

Consequently, a need exists for an improvement of dual tone multi-frequency (DTMF) telephone number dialer devices so as to make them more user-friendly and thus of greater utility to users.

SUMMARY OF THE INVENTION

The present invention provides an object-oriented programmable dedicated dialer device designed to satisfy the aforementioned need. By means of a user simply touching a touch sensitive sensor on the device as the device is pressed to the telephone receiver mouthpiece (speaker), the user accomplishes the dialing of an organization's telephone number. This mode of use is much simplier than use of the card-like object of the patents cited earlier where the user has to open a flap or push a button while holding the card close to the telephone receiver mouthpiece.

Accordingly, the present invention is directed to a dedicated dialer device which comprises: (a) a hollow body defining an interior cavity therein; (b) control means disposed in the interior cavity for storing a telephone number and for producing a plurality of tones necessary to dial the stored telephone number; and (c) a touch sensor mounted on the hollow body and connected to the control means and being operable for converting the control means from a deactivated state to an activated state to cause the control means to dial the stored telephone number in response to a user touching the hollow body.

The present invention also is directed to a dedicated dialer device which comprises: (a) a hollow disc-shaped body defining an interior cavity therein, the hollow body having an object-oriented graphic substantially centrally imprinted on one exterior side thereof; (b) an automatic telephone dialing mechanism disposed in the interior cavity and including a microcontroller, a power supply, and a sound-generating transducer being electrically connected together, the microcontroller being operable to store the telephone number and to produce a plurality of tones via the sound-generating transducer necessary to dial the stored telephone number; and (c) means mounted on the hollow body and being operable for converting the telephone dialing mechanism from a deactivated state to an activated state to cause the telephone dialing mechanism to dial the stored telephone number; (d) the hollow body having a plurality of holes defined centrally therein on another exterior side thereof opposite from the one exterior side thereof which permit passage of the tones generated by the sound-generating transducer from the interior cavity of the hollow body.

The present invention further is directed to a method of programming a telephone number into a dedicated dialer device and of calibrating tone signal frequencies of the programmed telephone number. The programming and calibrating method comprises the steps of: (a) programming a plurality of digits in an automatic telephone number dialing mechanism; (b) programming a speed calibration byte in the automatic telephone number dialing mechanism; (c) generating a plurality of dual tone multi-frequency (DTMF) tones; (d) reading the DTMF tones to determine whether their frequencies are too high or too low relative to a reference level or are the same as the reference level; (e) changing the value of the speed calibration byte in response to the frequencies of the DTMF tones being too high or too low; and (f) repeating the method starting at step (a) until the frequency sequence of the DTMF tones are verified as being the same as the reference level. The changing of the value of the speed calibration byte includes decreasing the value of the speed calibration byte in response to the frequencies of the DTMF tones being too high and increasing the value of the speed calibration byte in response to the frequencies of the DTMF tones being too low. The programming includes digitally downloading the plurality of digits and the speed calibration byte in the automatic telephone number dialing mechanism.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a side elevational view of an object-oriented dedicated dialer device of the present invention placed on the mouthpiece of a telephone receiver.

FIG. 2 is a front plan view of the dedicated dialer device as seen along line 3—3 of FIG. 1.

FIG. 3 is a rear plan view of the dedicated dialer device as seen along line 4—4 of FIG. 1.

FIG. 4 is a sectional view of the dedicated dialer device of FIG. 1.

DETAILED DESCRIPTION OF THE INVENTION

Figure 6:
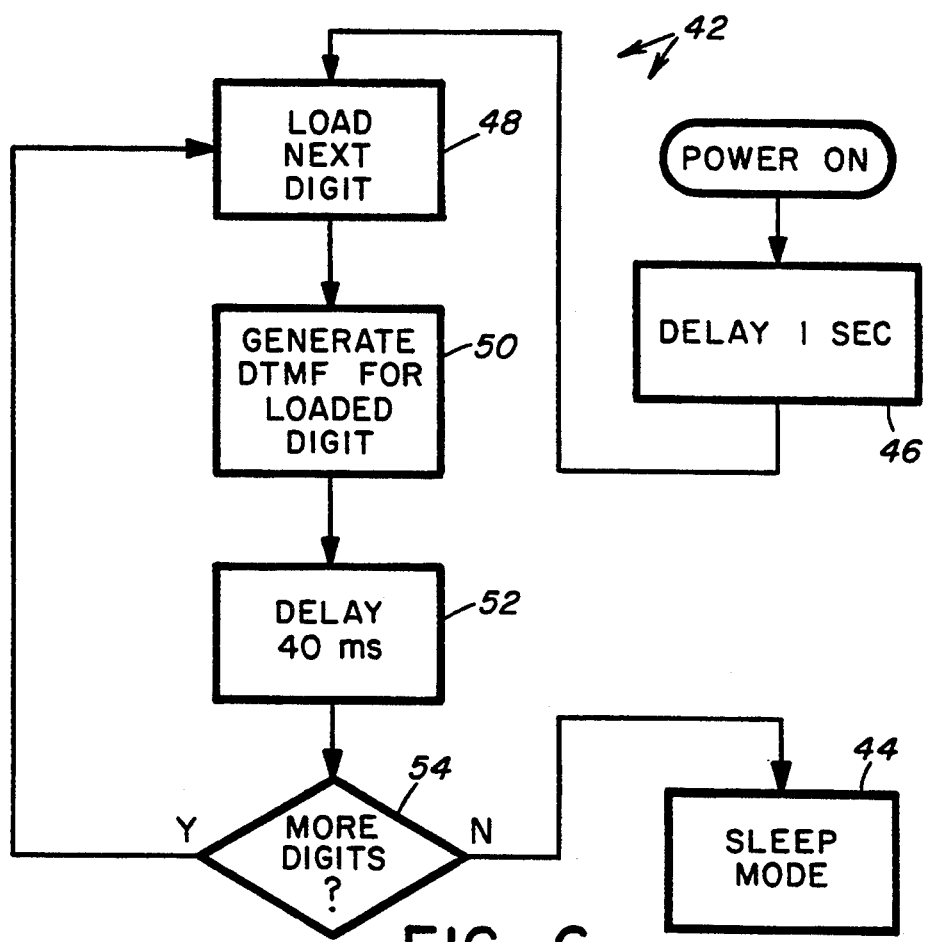
FIG. 6 is a flow chart illustrating the operation the first embodiment of the telephone dialing mechanism of FIG. 5.

Referring to the drawings, and particularly to FIGS. 1-4, there is illustrated an object-oriented programmable dedicated dialer device of the present invention, being generally designated 10. The dedicated dialer device 10 is shown placed over a mouthpiece M of a telephone receiver R. A finger F is shown touching the dedicated dialer device 10 thereby activating the device 10.

The dedicated dialer device 10 includes a hollow disk-shaped body 12 having a front cover 14 and a rear base 16 facing one another and being attached with one another in any suitable manner. The front cover 14 and rear base 16 together define an interior cavity 18 in the hollow body 12. Each of the front cover 14 and rear base 16 has a substantially flat main membrane or panel 14A, 16A and an annular rim 14B, 16B surrounding and integrally attached to the periphery of the main panel 14A, 16A. The annular rim 14B, 16B extends outwardly from one side of the main panel 14A, 16A. The front cover 14 and rear base 16 can be connected together in any suitable manner, such as by being rigidly bonded or welded or press fitted to each other at the rims 14B, 16B thereof. Although, in the illustrated embodiment, the hollow body 12 is circular in configuration, it should be readily apparent that other configurations are possible.

Figure 5:
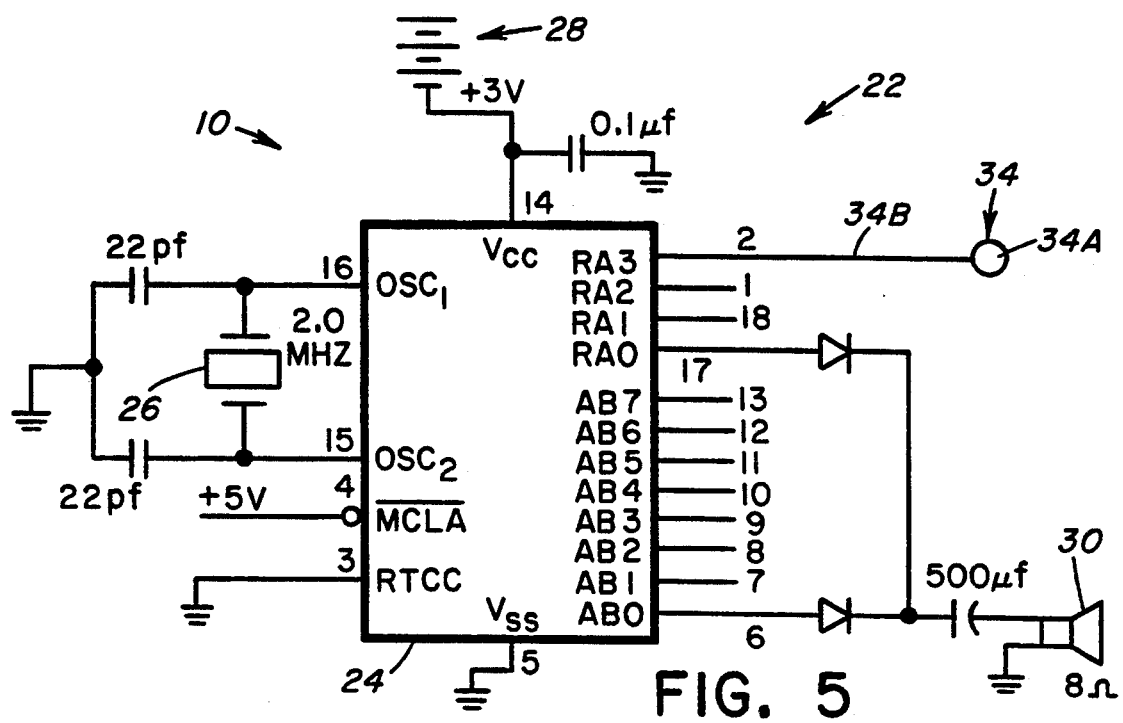
FIG. 5 is a schematic diagram of a first embodiment of the telephone dialing mechanism of the dedicated dialer device.

Referring to FIGS. 2 and 5, the dedicated dialer device 10 also includes control means preferably in the form of an automatic telephone number dialing mechanism 22. The dialing mechanism 22 is disposed in the interior cavity 18 and mounted on the interior side of the main panel 14A, 16A of either one of the front cover 14 and rear base 16, but preferably on the rear base 16. The dialing mechanism 22 functions to store a desired telephone number and to produce a plurality of tones necessary to dial the stored telephone number. The dialing mechanism 22 includes a microcontroller 24, a ceramic resonator 26, a battery 28, and a sound-generating speaker or transducer 30 mounted on a circuit board 32 in the interior cavity 18. To use the dedicated dialer device 10, the hollow body 12 is placed over the telephone receiver mouthpiece M and then the front cover 14 is touched by a finger of the user to thereby automatically activate the dialing mechanism 22.

Referring also to FIGS. 2 and 5, the dedicated dialer device 10 further includes means in the form of a touch sensor 34 mounted on the front cover 14 of the body 12 for converting the microcontroller 24 from a deactivated state to an activated state, in response to the touching by the user's finger F to cause the dialing mechanism 22 to dial the stored telephone number. The electrical potential of the person touching the sensor 34 is sufficiently different from drive circuitry (not shown in FIG. 5 but represented by the transistor 68 in FIG. 7) that sufficient current is injected into the drive circuitry connected to the microcontroller 24 to cause activation of the same. The touch sensor 34 includes an electrically conductive touch plate 34A mounted in a recess 14C formed in the flat panel 14A of the front cover 14 and an electrically conductive post 34B extending through a hole 14D in the front cover 14 and interconnecting the touch plate 34A with the drive circuitry on the circuit board 32 within the hollow disc-shaped body 12 such that the touch sensor 34 is electrically coupled to the microcontroller 24.

The microcontroller 24 stores a preprogrammed telephone number in its memory and produces a plurality of DTMF tones corresponding to the stored number. When the touch sensor 34 is activated by being touched, the microcontroller 24 begins its operation, generating a plurality of signals which represent the DTMF tones necessary to dial the stored telephone number. The DTMF signals constitute output to the sound-generating transducer 28 which in response thereto generates the DTMF tones.

Referring to FIG. 3, the rear base 16 also has a thin annular-shaped magnet 36 mounted centrally on the exterior side of its main panel 16A so that the hollow disk 12 will cling to a convenient metallic surface when not in use, such as the metal door of a refrigerator. The rear base 16 further has a plurality of holes 38 surrounding the magnet 36 which permit passage of the audible DTMF tones generated by the sound-generating transducer 30 from the interior cavity 18 into the mouthpiece M of the telephone receiver R.

Referring to FIGS. 1, 2 and 4, the dedicated dialer device 10 also has an object-oriented graphic or logo 40 imprinted on an exterior side of the front cover 14. The logo 40 can be representative of the organization whose telephone number is stored in the microcontroller 24. The graphic or logo 40 enables the user to consciously associate the goods or services with the organization that are DTMF-dialed by the dialer device 10. For instance, if a pizza establishment is the object graphic, then by the user pressing the dialer device 10 to the telephone receiver R and touching the touch sensor 34, a call is generated to the pizza delivery service with which the graphic is associated.

Referring to FIG. 5, in order to accomplish the function of the present invention, the dialing mechanism 22 must generate DTMF signals that do not exceed the maximum error frequency of +/−1.5%+2 Hz as per the telephone company specifications set forth in the following documents: (1) Bell Communications Research Technical Reference TR-TSY-000181, issued Mar. 1, 1987 and (2) American Telephone and Telegraph Company Compatability Bulletin No. 105, issued Aug. 8, 1974. Each numerical digit (0, 1, 2, . . . , *, #) is created by tone pairs that are produced by combining two simultaneous sine waves. The tones are composed of one low frequency group (697, 770, 852, 941 Hz) combined with one high frequency group (1209, 1336, 1477, 1633 Hz). The duration of a tone pair is 40 ms or longer and the inter-tone interval (the spacing between tone pairs) is 40 ms or longer.

In the first embodiment of the dedicated dialing mechanism 22 of FIG. 5, the microcontroller 24 can be a PIC 16C54 8-bit CMOS microcontroller manufactured by Microchip Technology, Inc., of Chandler, Arz., USA. The PIC 16C54 is a satisfactory component in the current technology for the design of this dedicated dialer device 10 since its output pin produces enough drive power so that a buffer is not required and it uses very low power when operating. The ceramic resonator 26 is set a 2 MHz and provides the timing from which all the tone frequencies are divided down. A suitable ceramic resonator 26 is manufactured by Murata Erie of State College, Penna., USA, under the designation CSA20.00MX111 or CSA3.58MG300.

As mentioned earlier, the touch sensor 34 is the means by which the microcontroller 24 is commanded to initiate the dialing operation. Touching the sensor 34 causes the microcontroller 24 to initiate the running of a program stored in the internal memory of the microcontroller 24 that generates the DTMF coded telephone number. The battery 28 provides 3 volts DC which is required to power the circuit.

When the touch sensor 34 is activated and the microcontroller 24 begins operation in accordance with the sequence of steps of the stored program, as represented by the flow chart 42 of FIG. 6, it first initializes the I/O ports. The microcontroller 24 executes the steps of the program to generate the plurality of signals which cause the transducer 30 to produce the DTMF tones necessary to dial the stored telephone number, then executes a low power sleep mode routine 44. Reexecution of this routine 44 occurs when the touch sensor 34 is activated again.

Generation of a tone for one digit involves the microcontroller 24 reading the first digit of the phone number stored in its internal memory. This digit is converted to two addresses: one for the high tone and one for the low tone located in the internal memory. These two addresses are the start of a table of numbers that are output to the output ports. This produces the combination signal of two sine waves each being outputted to 2 pins respectively. This signal is continued for 40 ms.

The microcontroller 24 then performs a NOP (no operation) software loop for 40 ms in order to provide the interdigit interval. This procedure is repeated until the last digit of the telephone number is transmitted then the microcontroller 24 executed its low power sleep mode routine 44.

Referring to FIG. 6, the flow chart 42 depicts the steps of the stored program that the dedicated dialer device 10 executes when powered on to effect dialing of the stored telephone number. Block 46 illustrates a one second delay in which the microcontroller 24 loops as per the NOP (no operation) instruction. This intentional delay is the means by which the user is provided time to increase the physical compliance accuracy of the dedicated dialer device 10 against the telephone mouthpiece M thereby improving the acoustic coupling between the dedicated dialer device 10 and the mouthpiece M.

The microcontroller 24 loads the first digit from its internal memory into an accumulator as depicted in block 48. Block 50 depicts the generation of the DTMF signal corresponding to the digit just loaded. Block 52 depicts the delay of 40 milliseconds after generation of DTMF signal for the loaded digit thereby corresponding to the required interdigit interval. Decision block 54 determines if there are any more digits left to generate. This is because the dedicated dialer device 10 may be programmed for a local 7 digit phone number or a long distance 11 digit telephone number such as a toll-free 800 telephone number.

If there are additional digits remaining, control is passed back to block 48 (load digit) for the process to continue. If, however, the last digit has been dialed, block 54 is executed and microcontroller 24 then execute the low power sleep mode routine, as per block 44, thereby terminating operation of the dedicated dialer device 10.

Figure 7:
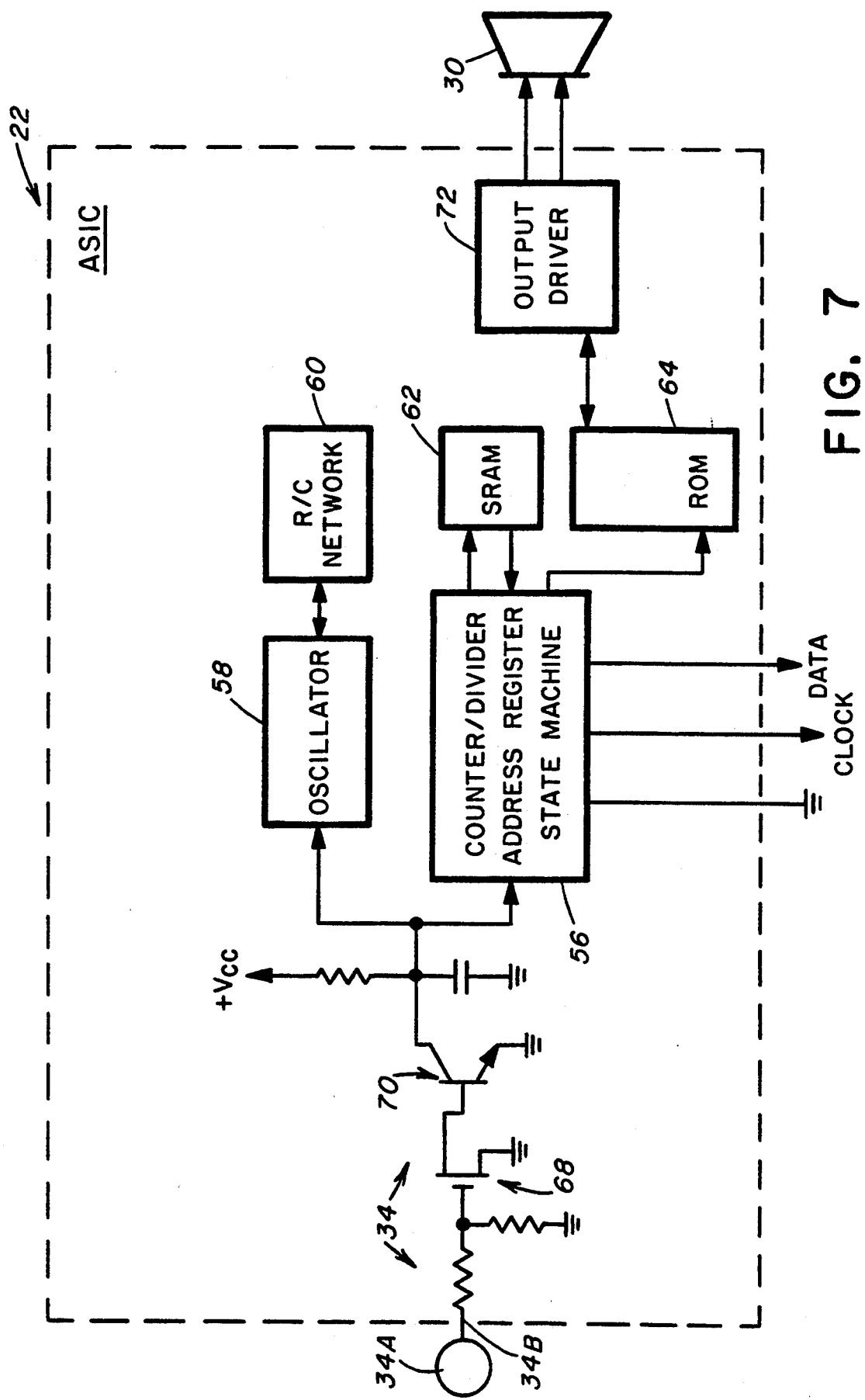
FIG. 7 is a schematic circuit diagram of a second embodiment of the telephone dialing mechanism of the dedicated dialer device.

Referring to FIG. 7, there is illustrated a second embodiment of the dedicated dialing mechanism 22 in the form of an application specific integrated circuit (ASIC). The ASIC 22 includes a counter/divider address register statement machine (CDARSM) 56, an oscillator 58 connected to the CDARSM 56, a resistor capacitor (RC) network 60 connected to the oscillator 58, a Static Random Access Memory (SRAM) 62 and Read Only Memory (ROM) 64 connected to the CDARSM 56, and the touch sensor 34 connected to both the CDARSM 56 and oscillator 58.

The touch sensor 34 includes the conductive touch plate 34A such as a metal foil which is illustrated in FIG. 2 as a circular element on the top of the hollow body 12. The touch sensor 34 also includes a FET 68 and a bipolar transistor 70. The touch plate 34A is the contact point to activate the remaining components of the touch sensor 34 which, in turn, initiate operation of the ASIC 22. When the touch plate 34A is activated, the gate of the FET 68 is turned on which in turn activates the bipolar transistor 70, enabling both the CDARSM 56 and oscillator 58. The oscillator 58 works in conjunction with the on-chip RC network 60 to provide the basic timing for the circuit operation. Clock pulses from the oscillator 58 are applied to the CDARSM 56. The CDARSM 56 accumulates the clock pulses into an address register which is divided by a programmed divisor number. The resulting number constitutes output through the 8 bit parallel binary port into the SRAM 62. The SRAM 62 stores the digits of the telephone number to be dialed. The ROM 64 stores the digital waveform data, as illustrated in FIG. 12, of each individual DTMF signal.

The address generated by the CDARSM 56 addresses sequentially the digits and the delay loops stored in the SRAM 62. These digits which are stored as binary numbers are then output from the SRAM 62 into the CDARSM 56. This number is processed in the CDARSM 56 by means of the calibration speed byte stored in the CDARSM and the CDARSM then generates an address number. This generated address number is applied to the ROM 64 as an address composed of 12 binary bits. This binary address causes the digital waveform signal stored in the ROM 64 to be output from the ROM to an output driver (OD) 72. The OD 72 conditions and amplifies the generated signal which is then applied to the speaker 30. The DTMF sounds are made audible by the speaker 30 thereby causing the DTMF sounds to be recognized by any DTMF decoder system.

Figure 8:
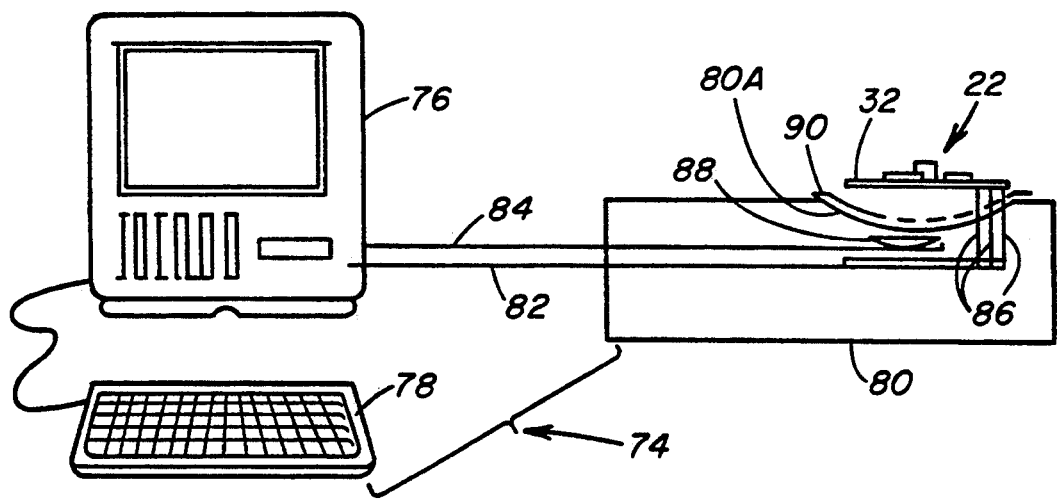
FIG. 8 is a diagrammatic perspective view of a programming system employed in accordance with the present invention, showing the interface connections between a computer and programming test fixture.

Also seen in FIG. 7 are three contact pins—ground, clock and data—which enable the ASIC 22 to receive binary data from a programming system 74, being illustrated in FIG. 8. The ground contact point is required as the signal reference for the clock and data pins that communicate the data from the programming system 74 to the ASIC 22. Not illustrated in FIG. 7 are plus and minus battery terminals which connect to the internal battery 28 of the dialer device 10.

The data transfer operation from the programming system 74 to the ASIC 22 takes place during the low going phase of the clock. When the clock is in the low going phase and if the signal on the data pin is high (+3V), then the signal is interpreted by the CDARSM 56 as a binary one ("1"). If however the signal is a low (0V), then the signal is interpreted by the CDARSM 56 as a binary zero ("0"). In this way, the CDARSM 56 interprets the incoming data stream into binary numbers which are stored in the SRAM 62. These numbers are interpreted as binary representing digits of a telephone number (0,1,2,3,4,5,6,7,8,9). The binary number 14 represents an interdigit pause. The binary number 15 represents a no operation (NOP). The NOP digit causes the no operation so that the ASIC 22 can be programmed to dial any number of DTMF digits up to 11 digits. The twelfth digit loaded is a calibration speed byte which sets the divisor operation thereby providing means to adjust the tone frequencies. The speed byte is only loaded into the CDARSM 56 in the divisor register and not into the SRAM 62. Following this last digit, the CDARSM 56 then recognizes this and then begins operation by outputting the DTMF signals of the programmed telephone number immediately, as explained previously.

Referring to FIG. 8, there is illustrated the programming system 74 employed in accordance with the present invention, showing the interface connections between a computer 76, keyboard 78 and programming test fixture 80. The programming system 74 provides for accuracy during the initial manufacture of the dialer device 10 with respect to telephone number down load and signal calibration. The computer 76 enables the entry of the programmed telephone numbers via the keyboard 78 or a disk drive input. The computer 76 interfaces to the programming test fixture 80 via two cables 82, 84. The first cable 82 is composed of three wires carrying digital signals that connect to the three spring loaded pins 86 located in the programming test fixture 80. The second cable 84 is composed of a shielded two-wire audio cable connected to a microphone unit 88 embedded in the programming test fixture 80. The digital wires of the first cable 82 are used for detecting the proper insertion of the dialer device 10 via the ground pin. When the ground pin is sensed, the computer 76 verifies the proper insertion in order to begin downloading the programming sequence. After the twelfth digit, the calibration speed byte, the dialer device 10 outputs the DTMF sequence. These tones are detected via the microphone unit 88 embedded in the programming test fixture 80 and sent to the computer 76 via the second or audio cable 84. The computer 76 processes this signal in order to determine if the system has programmed correctly and is calibrated accurately.

Also, FIG. 8 illustrates a mating key index slot 80A on the programming test fixture 80. FIG. 8 also shows the dialer device 10 of the present invention with the three data pins 86 being inserted into certain of the holes 38 in the body 12 in order to program the telephone dialing mechanism 22. An indexing key on the device 10 enables the correct insertion so that the programming pins 86 contact the proper signals.

Figure 10:
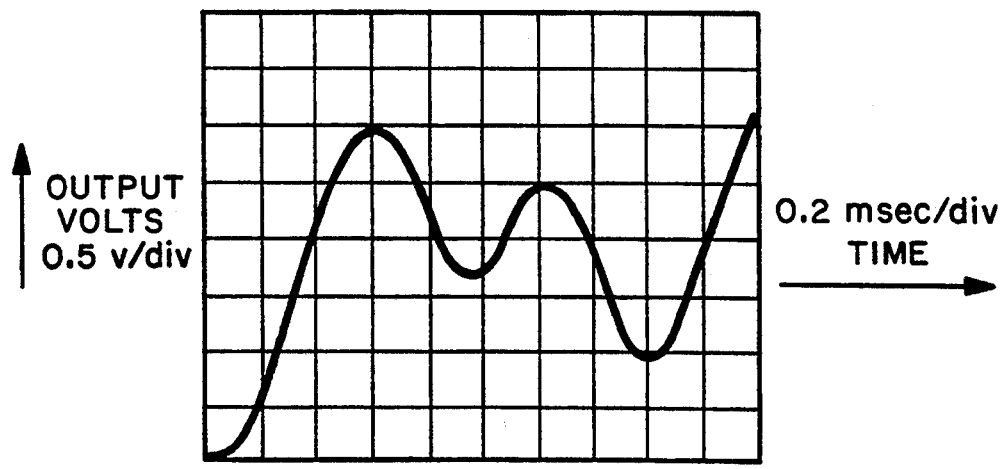
FIG. 10 is a waveform diagram of a DTMF digit 8 as stored in the telephone dialing mechanism of FIG. 7.
Figure 9:
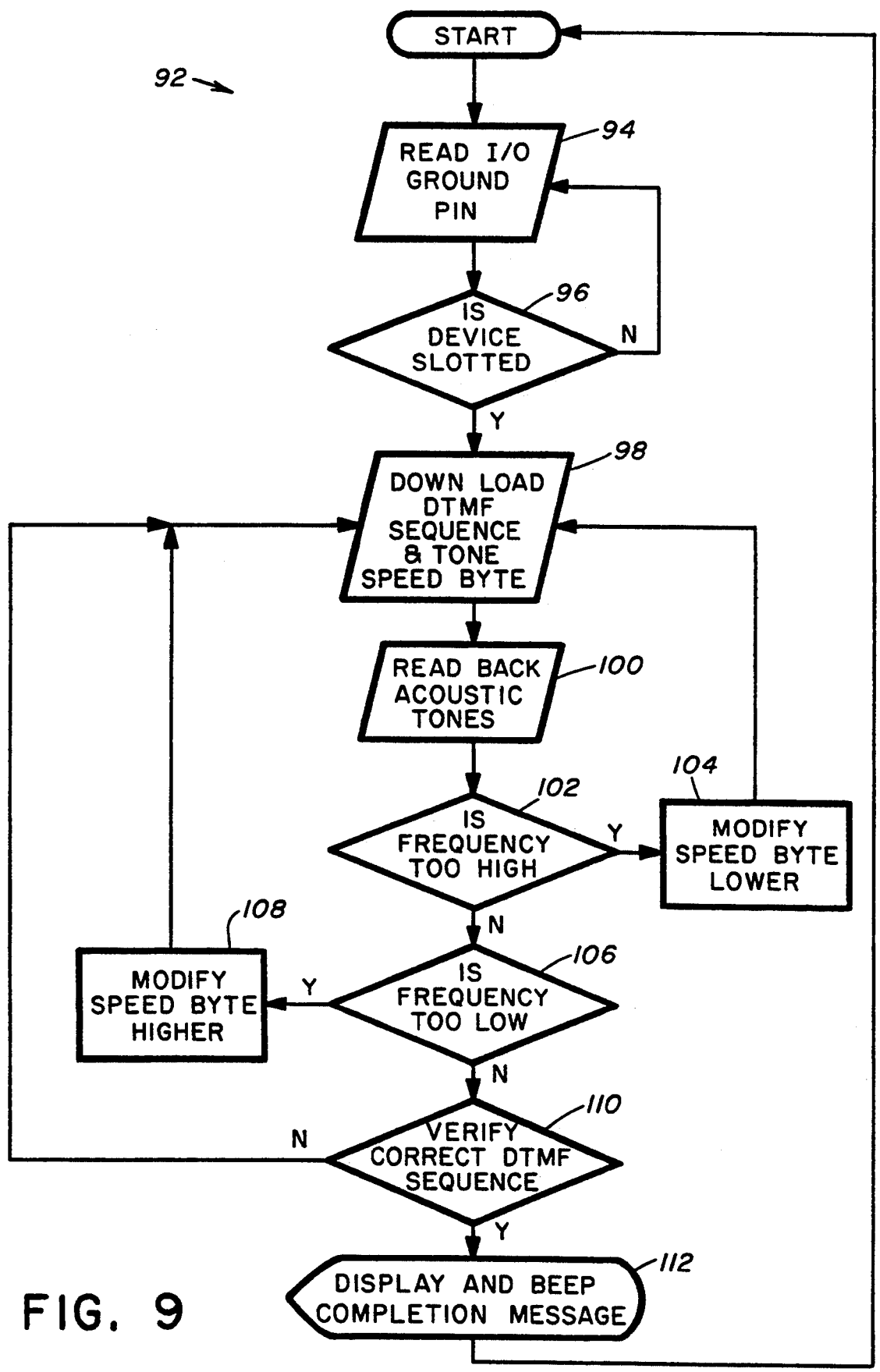
FIG. 9 is a flow chart illustrating the operation of the programming system of FIG. 8 used to program a telephone number into the telephone dialing mechanism of FIG. 7 and to calibrate the tone signal frequencies.

Referring to FIG. 9, the flow chart 92 illustrates the programming and calibrating operations of the present invention performed by utilizing the programming system 74 of FIG. 8. The flow chart 92 represents a software program stored in the memory of the computer 76 which is the means by which a telephone number is programmed into the dialer device 10 and the tone signal frequencies are calibrated. The procedure begins when the dialer device 10 is correctly inserted into the slot 80A of the programming test fixture 80. As per sequential blocks 94 and 96, the program determines the correctness of the insertion by means of detecting the ground pin at a low state. Then, as per block 98, the program digitally downloads the eleven digits (or for example seven digits plus four NOP digits), then the speed calibration byte. The speed calibration byte is set to the value of the previous device programmed and tested. This is because the RC network does not vary as much within one wafer batch as it may vary from batch to batch. As per block 100, the program next reads the acoustic DTMF tones generated by the dialer device. If, as per block 102, the program determines that the frequencies are too high, as per block 104 the program then decreases the value of the speed calibration byte and then re-enters the entire digital sequence again at block 98. If, as per block 106, the program determines that the frequencies are too low, as per block 108 the program then increases the value of the speed calibration byte and then re-enters the entire digital sequence against at block 98. FIG. 10 illustrates a DTMF digit 8 composed of digital sequences stored in the ROM 64. The correct DTMF frequency sequence is verified at block 110 and a completion message is displayed on the computer 74 as per block 112 to conclude the procedure.

From the above description it will be readily understood that, among others, the object-oriented dedicated dialer device 10 has the following desirable attributes. First, the dialer device 10 is made up of components that are as inexpensive as possible to manufacture and thus permits the low-cost device 10 to be given away as an advertising specialty. The device 10 utilizes intelligent software along with relatively inexpensive hardware that normally would be unusable for this application—ceramic resonator and RC network—as a solution for a low cost and accurate DTMF dialer. Second, the dialer device 10 is able to store and reproduce a DTMF sequence which is a specified telephone number. Third, even though a reference oscillator is used at the sacrifice of some accuracy compared to use of a more expensive crystal oscillator, the dialer device 10 is designed to be able to accurately reproduce the DTMF signals representing each digit of the telephone number in accordance with telephone company specifications set forth in documents referenced above. Prior art DTMF tone generators have required relatively expensive hardware components (crystal oscillators) to ensure the timing accuracy as specified in the cited documents.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

We claim:

1. A dedicated dialer device, comprising:
   (a) a hollow body defining an interior cavity therein;
   (b) control means disposed in said interior cavity for storing a predetermined telephone number and for producing a plurality of tones necessary to dial the stored predetermined telephone number, said control means being an automatic telephone number dialing mechanism disposed in said interior cavity, said dialing mechanism including a microcontroller, a power supply and a sound-generating transducer being electrically connected together, said microcontroller storing the predetermined telephone number; and
   (c) a touch sensor connected to said control means and being operable in response to a user touching said touch sensor for converting said control means in a non-switching manner from a deactivated state to an activated state to cause said control means to dial the stored predetermined telephone number, said touch sensor including an electrically-conductive touch plate mounted to the exterior of said hollow body, drive circuitry disposed in said internal cavity and electrically coupled to said microcontroller and conductor means extending from said touch plate to said drive circuitry and electrically connecting said touch plate to said drive circuitry, said drive circuitry being set at an electrical potential sufficiently different from that of a human user such that said drive circuitry is adapted to receive an injection of electrical current sufficient to cause actuation of said microcontroller in response to a human user physically touching said touch plate.

2. The device of claim 1 wherein said hollow body has a front cover and a rear base facing one another and being attached with one another and together defining said interior cavity in said hollow body.

3. The device of claim 2 wherein each of said front cover and rear base has a flat main panel and an annular rim surrounding and attached to a periphery of said main panel.

4. The device of claim 3 wherein said front cover has an object-oriented graphic imprinted on said flat main panel thereof.

5. The device of claim 3 wherein said front cover and rear base having interfitting elements defined on said annular rims thereof for attaching said front cover and rear base together.

6. The device of claim 3 wherein said annular rim extends outwardly from one side of said main panel.

7. The device of claim 2 wherein said control means is an automatic telephone number dialing mechanism disposed in said interior cavity and between said front cover and rear base of said hollow body.

8. The device of claim 1 wherein said hollow disc-shaped body is circular in configuration.

9. The device of claim 10 wherein said sound-generating transducer is centered one of a pair of opposite sides of said hollow body.

10. The device of claim 2 wherein said rear base has a magnet mounted on an exterior side thereof.

11. The device of claim 10 wherein said rear base further has a plurality of holes surrounding said magnet which permit passage of the tones generated by said sound-generating transducer from said interior cavity of said hollow body.

12. The device of claim 2 wherein said front cover has an object-oriented graphic imprinted on an exterior side thereof.

13. The device of claim 2 wherein said rear base has a plurality of holes defined therethrough which permits passage of the tones generated by said sound-generating transducer from said interior cavity of said hollow body.

14. A method of programming a telephone number into a dedicated dialer device and of calibrating tone signal frequencies of the programmed telephone number, said method comprising the steps of:
   (a) programming a plurality of digits in an automatic telephone number dialing mechanism;
   (b) programming a speed calibration byte in the automatic telephone number dialing mechanism;
   (c) generating a plurality of dual tone multi-frequency (DTMF) tones;
   (d) reading the DTMF tones to determine whether their frequencies are too high or too low relative to a reference level or are the same as the reference level;
   (e) changing the value of the speed calibration byte in response to the frequencies of the DTMF tones being too high or too low; and
   (f) repeating the method starting at step (a) until the frequency sequence of the DTMF tones are verified as being the same as the reference level.

15. The method of claims 14 wherein said changing of the value of the speed calibration byte includes decreasing the value of the speed calibration byte in response to the frequencies of the DTMF tones being too high.

16. The method of claim 15 wherein said changing of the value of the speed calibration byte includes increasing the value of the speed calibration byte in response to the frequencies of the DTMF tones being too low.

17. The method of claim 14 wherein said changing of the value of the speed calibration byte includes increasing the value of the speed calibration byte in response to the frequencies of the DTMF tones being too low.

18. The method of claim 14 wherein said programming includes digitally downloading the plurality of digits and the speed calibration byte in the automatic telephone number dialing mechanism.

* * * * *